United States Patent [19]

Medlock

[11] 4,222,859
[45] Sep. 16, 1980

[54] PARTICLE SEPARATOR DEVICES

[75] Inventor: Curtis M. Medlock, Memphis, Tenn.

[73] Assignee: Charles Medlock, Houston, Tex.

[21] Appl. No.: 4,154

[22] Filed: Jan. 17, 1979

[51] Int. Cl.² ............................................. B07B 7/02
[52] U.S. Cl. .................................... 209/143; 209/154;
55/235; 55/277; 406/166
[58] Field of Search .............................. 209/132–137,
209/140–144, 154, 483, 487–488, 498–499;
55/235, 415, 461, 277, 429, 432, 459 R, 459 A,
459 D; 241/47; 302/59

[56] References Cited

U.S. PATENT DOCUMENTS

| | | | |
|---|---|---|---|
| 2,003,141 | 5/1935 | Dorfan | 209/137 |
| 2,300,761 | 11/1942 | Amy | 55/277 |
| 3,397,780 | 8/1968 | Beuzeval | 209/137 |
| 3,710,561 | 1/1973 | Garrone | 55/461 |
| 3,865,242 | 2/1975 | Musto | 209/143 |
| 3,883,423 | 5/1975 | Turner et al. | 209/143 |

*Primary Examiner*—Ralph J. Hill
*Attorney, Agent, or Firm*—Larry Mason Lee

[57] ABSTRACT

A particle separator which is highly efficient in the removal of suspended particulate matter from a gaseous fluid flow; which depends for its operation on centrifugal forces acting on the particulate matter which are caused and controlled by rotational direction changes induced in the fluid flow by the shape of the inner walls of the chamber which comprises the particle separator; and which derives its efficiency not only from controlability of the turning radius of the fluid flow during an induced rotational direction change, but also from recognition and utilization of the fact that particles suspended in that portion of the fluid flow which is nearest the center of rotation of the fluid flow may be unable to cross the center of fluid flow (which has a higher velocity than the outer edges of the flow) and thus be unable to separate from the flow during induced rotational direction changes necessitating a second induced rotational direction change wherein those particles which were formerly nearest the center of the rotation of the fluid flow will (during the second induced rotational direction change) be farthest from the center of the rotation of the fluid flow, have the maximum centrifugal forces applied and be most readily separated from the gaseous fluid flow.

18 Claims, 3 Drawing Figures

PARTICLE SEPARATOR DEVICES

PRIOR ART STATEMENT

The closest prior art of which applicant is aware is contained in the below listed patents:
a. U.S. Pat. No. 3,865,242; Feb. 11, 1975; Richard Leopold Musto
b. U.S. Pat. No. 3,397,780; Aug. 20, 1968; Douglas R. Beuzeval
c. U. S. Pat. No. 3,883,423; May 13, 1975; Robert R. Turner and Ralph H. Hart
d. U.S. Pat. No. 3,710,561; Jan. 16, 1973; Franco Garrone The above referenced patents were located within the following classes and subclasses: 55/429, 432, 459, 461 and 209/136, 137, 143, 144

Reference a. describes a particle separator which uses a curved duct to produce centrifugal forces on the particles which then concentrate in one portion of the gaseous fluid flow which is then split by a baffle diverting that portion of the gaseous fluid flow containing the concentration of particles in one direction and that portion of the gaseous fluid flow which lacks the concentration of particles in another direction.

Reference b. describes a particle separator which is comprised of a chamber which produces a circulatory fluid flow from which the heavier particles in the gaseous fluid flow will, under the force of gravity fall to the bottom of the chamber, through a grid and into a collection recepticle while, due to scrubbing action of particulate matter in the fluid flow against the walls of the chamber combined with the turbulence created by a cascade of vanes across the fluid flow outlet at the top of the chamber and the directional application of a nonparticulate bearing fluid flow across the grid at the bottom of the chamber, lighter particles are retained in the fluid flow as it passes through the outlet at the top of the chamber.

Reference c. describes a particle separator which consists of a chamber shaped to produce a vortex of circulating fluid flow which will contain the heavier particles entrained in the fluid flow entering the single inlet and directed against a baffle which tends to catch the heavier particles which then cascade downward under the force of gravity; gravity additionally causes the heavier particles to move into the vortex of circulating fluid flow and be forced down through the entering fluid flow which assures that lighter (fine) particles are recaptured by the fluid flow while the heavier particles are separated out of the flow.

Reference d. describes a particle separator which is comprised of a portion of curved duct which produces centrifugal forces which act to force the particles suspended in the fluid flow along the outer wall of the curved duct where the particles are then deflected out through an opening in the outside wall of the curved duct.

SUMMARY OF INVENTION

The present invention relates generally to that class of devices that separate or remove particulate matter which is suspended in a gaseous fluid flow from the fluid flow and more particularly to devices which utilize centrifugal force to separate the particles from the flow.

Several particle separator devices are known which utilize centrifugal forces generated by rotating or whirling the fluid flow to force particles out of the stream of the fluid flow. Some of these devices are quite effective at separating out the coarse or heavy particles; however, effectiveness seems to diminish in a direct relationship to a decrease in the size and/or mass of the particle to be removed from the fluid flow. Certain effects present in a high velocity fluid flow through a ductwork seem not to have been taken into account. In particular, it can be noted that the velocity of fluid flow is not a constant across a cross-sectional plane perpendicular to the direction of flow within a duct. This occurs due to mechanical interaction between the fluid flow and the inner walls of the duct. Therefore, fluid flow velocities are lower near the walls of the duct and at a maximum in the cross-sectional center of the fluid flow stream. Therefore, fine particles near the duct walls face a barrier of higher velocity fluid flow in the center of the stream when they are subjected to centrifugal forces in an attempt to separate them out.

It is a principal object of the present invention to provide a device which will effectively separate fine particles (as, for example, smoke particles suspended in air) from a gaseous fluid flow.

It is another object of the present invention to provide a device which will separate fine particles from a gaseous fluid flow and which is inexpensive to manufacture and to operate.

It is another object of the present invention to provide a device which will separate fine particles from a gaseous fluid flow using centrifugal forces and overcoming problems caused by the failure of fine particles to cross through the high velocity region in the center of the fluid flow.

It is a further object of the present invention to provide a device to separate fine particles from a gaseous fluid flow without significant fluid pressure loss.

Other and further objects and advantages of the invention will be apparent from the accompanying drawing and the detailed description of the invention.

DESCRIPTION OF THE INVENTION

Figures 1, 2:
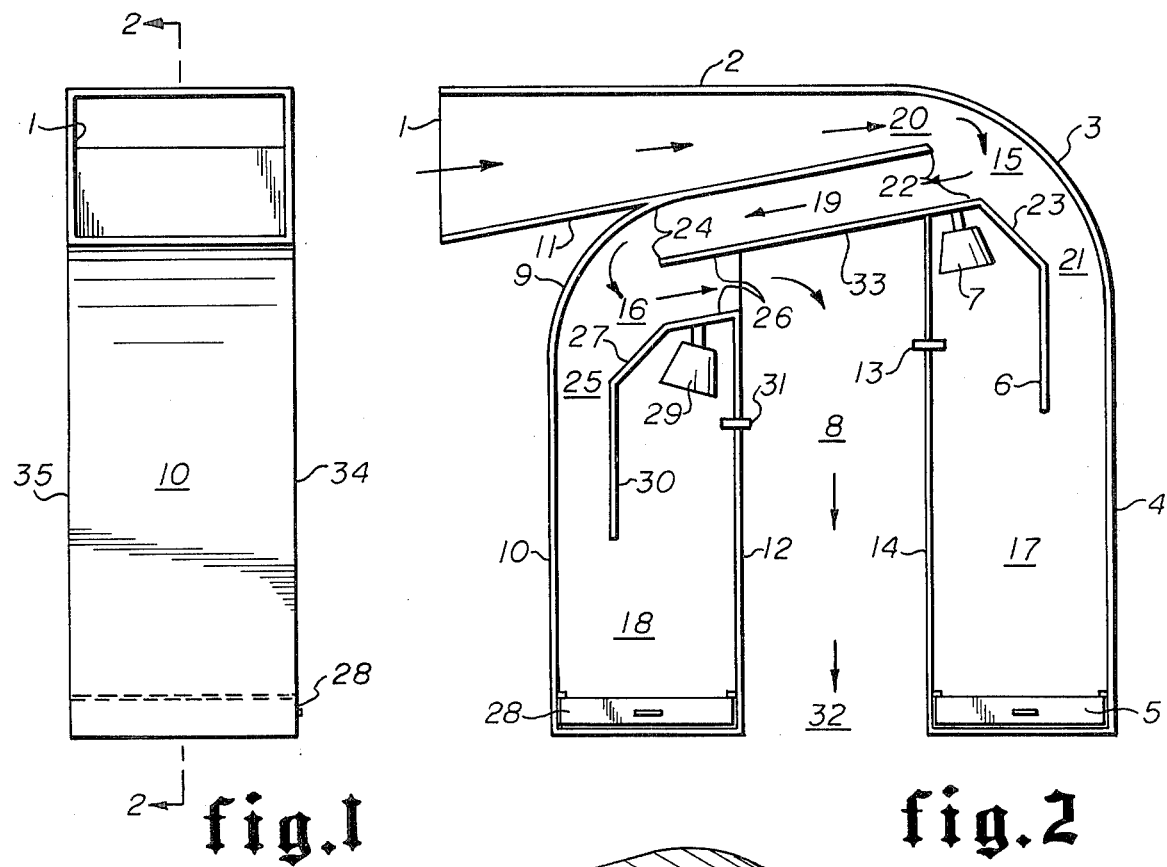
FIG. 1 is a vertical sectional elevation of the invention.
FIG. 2 is a general perspective view, partly broken away to show internal construction, of the invention.
Figure 3:
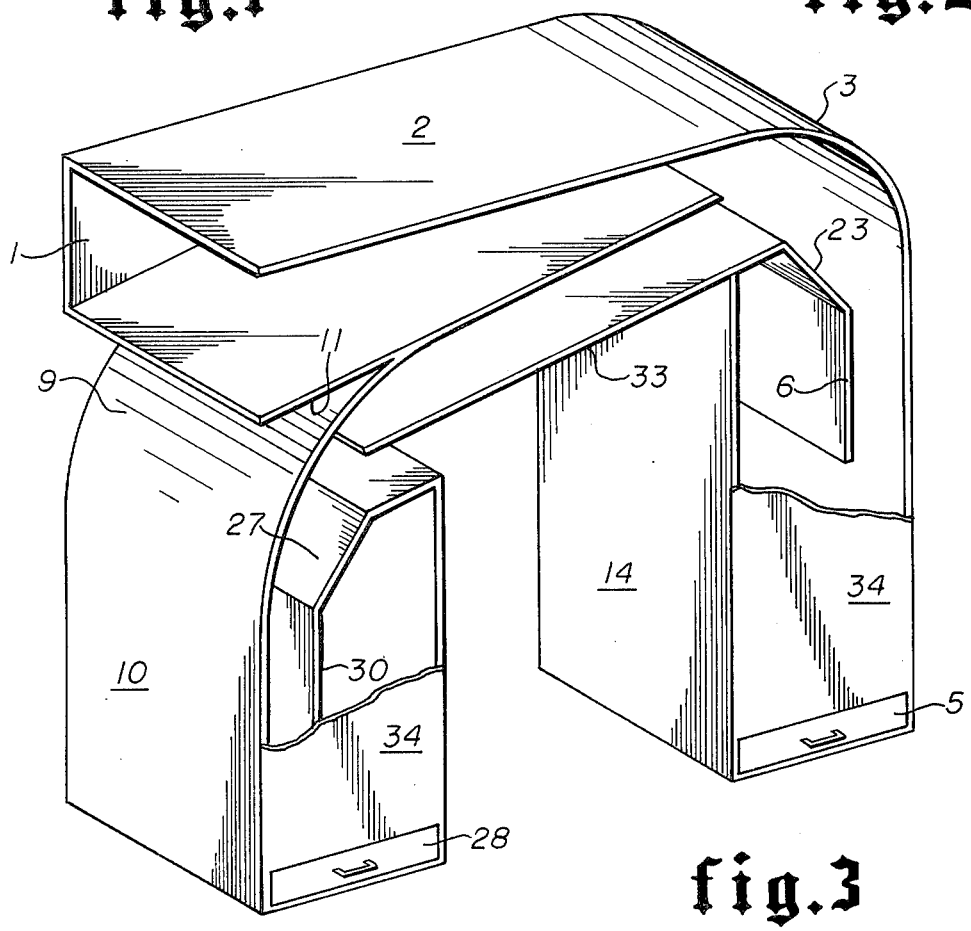
FIG. 3 is a lateral elevation of the invention.

The present invention comprises an input duct 1, a separation chamber 15, a collection chamber 17, a connecting duct 19, a second separation chamber 16, a second collection chamber 18, and an output duct 8 all of which are hereinafter described in greater detail. The invention has a pair of side walls 34, 35 constituting the opposite ends of the invention. Each wall hereafter mentioned in the invention connects to both wall 34 and wall 35 so that the distance between the wall 34 and the wall 35 defines the width of the invention and so that the invention comprises a vessel. The input duct 1 communicates with the separation chamber 15 through the intake orifice 20 of the separation chamber 15. The walls 2, 11 of the input duct 1 may be convergent toward the intake orifice 20 of the separation chamber 15 as shown in the drawing of the preferred embodiment in order to columnate the fluid flow and increase the velocity of the fluid flow.

The failure of fine particulate matter suspended in the low velocity portion of a fluid flow stream nearest the walls of a duct through which the fluid is flowing to cross the barrier formed by the high velocity fluid flow in the center of the duct is compensated for in the present invention by the use of two separation chambers. The separation chamber 15 is designed to remove particles from one-half of the fluid flow, from center stream to the wall 2 of the input duct 1, without creating turbulence which would cause redistribution of the particles throughout the stream. The separation chamber 16 then removes particles from one-half of the fluid flow, from center stream to wall 11 of the connecting duct 19 (which is the same fluid which constituted the one-half of the fluid flow in the input duct 1 between the center stream and wall 11 before the 180° rotation of the fluid stream by the separation chamber 15), without creating turbulence which would cause redistribution of the particles throughout the stream.

The separation chamber 15 comprises a curved outer wall 3, and an inner wall 23, and, provides an output orifice 21, another output orifice 22, and an intake orifice 20. In the preferred embodiment orifices 21, 22, 20 are in wall 23. The shape, size and position of the intake orifice 20 are such as will direct the fluid flow from the input duct 1 onto the curved surface of the outer wall 3 of the separation chamber 15. The shape of the curved surface which is the outer wall 3 of the separation chamber 15 must be such as will cause the fluid flow to take a circular path toward the output orifice 21 of the separation chamber 15. The output orifice 21 allows communication between the collection chamber 17 and the separation chamber 15. Very little, if any, of the fluid flow will be through the output orifice 21 as the collection chamber 17 acts essentially as a closed vessel. The collection chamber 17 creates a back pressure to the fluid flow which acts as a barrier to the fluid flow within the separation chamber 15 forcing the fluid flow up along the inner wall 23 of the separation chamber 15 and into the output orifice 22. The location of the output orifice 22 should be immediately adjacent to the intake orifice 20 to allow the velocity vector of the fluid flow which has entered the separation chamber 15 to undergo the maximum angular displacement before exiting the separation chamber 15. In the preferred embodiment the angular displacement of the velocity vector of the fluid flow in the separation chamber 15 approximates 180°. The shape of the inner wall 23 of the separation chamber 15 must be such as will allow uninterrupted, smooth fluid flow past the inner wall 23 between the output orifice 21 and the output orifice 22 and acts to contain the circular fluid flow within the sepration chamber 15. Further, the location of wall 23 and the location of orifice 22 must be such as will cause approximately one-half of the fluid flow entering the separation chamber 15 through the orifice 20 to smoothly and without turbulence exit the separation chamber 15 through the orifice 22 without describing the circular path through the separation chamber 15 and in proximity to the orifice 21 which is forced upon the fluid flow by the wall 3. This allows those particles which are suspended in the low velocity fluid flow along wall 11 of the input duct 1 to proceed uninterrupted into duct 19 without attempting to cross the high velocity center of the fluid flow. In the preferred embodiment the wall 23 is a flat, planar surface which, if extended to intersect the wall 11, forms an angle with wall 11 of approximately 57 degrees and 20 minutes.

The collection chamber is in communication with and connects to the separation chamber 15 through the orifice 21 in the wall 23. The collection chamber 17 is comprised of wall 4, wall 14 and a means for removal of particulate matter 5 which settles to the bottom of the collection chamber 17. The means for removal of particulate matter 5 which settles to the bottom of the collection chamber 17 is located at the bottom of the collection chamber 17 and may comprise a drawer which may be intermittently removed and emptied of particulate matter or it may comprise various more complex valve and/or conveyor mechanisms which accomplish the same task of removing the settled particulate matter from the collection chamber 17 without allowing significant fluid flow out of the collection chamber 17. The collection chamber 17 may include as additional elements a means for settling particulate matter 7 which is suspended in the fluid within the collection chamber 17, a baffle 6 which extends into the collection chamber 17 a sufficient distance to inhibit interaction between eddy currents and random fluid currents within the collection chamber 17 and the circular fluid flow path within the separation chamber 15, and an output orifice 13 in the wall 14 of the collection chamber 17 which may be of adjustable size. The means for settling particulate matter 7 which is suspended in the fluid within the collection chamber 17 is located behind the baffle 6 and is shielded by the baffle 6 from the circulating fluid flow in the separation chamber 15. The means for settling particulate matter 7 may comprise an ultra sound transducer, an electrostatic deflector, a spray nozzle as indicated in the drawing of the preferred embodiment, or any other device which is capable of forcing fine particulate matter suspended in the essentially static fluid within the collection chamber 17 down to the means for removal of particulate matter 5. The output orifice 13 should be small in relation to the orifice 21 as the fluid flow through the collection chamber 17 should be minimal. The purpose of the output orifice 13 is to allow adjustment of the fluid backpressure generated within the collection chamber 17 thereby adjusting the location of the barrier to the fluid flow within the separation chamber 15 which is created by the backpressure to the fluid flow from the collection chamber 17. The location of the output orifice 13 within the collection chamber 17 must be such as will create minimal circulating fluid currents within the collection chamber 17 and have negligible effect on the circulating fluid flow within the separation chamber 15. The location of the output orifice 13 in the preferred embodiment is shielded from the input orifice 21 by the baffle 6 and is in a section of the collection chamber 17 wall 14 which allows the collection chamber 17 to communicate with the output duct 8.

The fluid flow leaving the separation chamber 15 will enter the connecting duct 19 through the orifice 22 and thereby the connecting duct 19 communicates with the separation chamber 15. The connecting duct 19 in the preferred embodiment shares a common wall 11 with the input duct 1 and also a common wall 33 with the collection chamber 17. The end of the connecting duct 19 opposite the orifice 22 connects to the input orifice 24 in wall 27 of the second separation chamber 16 and thereby the connecting duct 19 provides communication between the separation chamber 15 and the second separation chamber 16.

The second separation chamber 16 comprises a curved outer wall 9, and an inner wall 27 and which provides an output orifice 25, another output orifice 26, and an intake orifice 24. In the preferred embodiment orifices 25, 26, 24 are in wall 27. The shape, size and position of the intake orifice 24 are such as will direct the fluid flow from the connecting duct 19 onto the curved surface of the outer wall 9 of the second separation chamber 16. The shape of the curved surface which is the outer wall 9 of the separation chamber 16 must be such as will cause the fluid flow to take a circular path toward the output orifice 25 of the second separation chamber 16. The output orifice 25 allows communication between the collection chamber 18 and the separation chamber 16. Very little, if any, of the fluid flow will be through the output orifice 25 as the collection chamber 18 acts essentially as a closed vessel. The collection chamber 18 creates a back pressure to the fluid flow which acts as a barrier to the fluid flow within the separation chamber 16 forcing the fluid flow up along the inner wall 27 of the separation chamber 16 and into the output orifice 26. The location of the output orifice 26 should be immediately adjacent to the intake orifice 24 to allow the velocity vector of the fluid flow which has entered the separation chamber 16 to undergo the maximum angular displacement before exiting the separation chamber 16. In the preferred embodiment the angular displacement of the velocity vector of the fluid flow in the separation chamber 16 approximates 180° C. The shape of the inner wall 27 of the second separation chamber 16 must be such as will allow uninterrupted, smooth fluid flow past the inner wall 27 between the output orifice 25 and the output orifice 26 and acts to contain the circular fluid flow within the second separation chamber 16. Further, the location of wall 27 and the location of orifice 26 must be such as will cause approximately one-half of the fluid flow entering the separation chamber 16 through the orifice 24 to smoothly and without turbulence exit the separation chamber 16 through the orifice 26 without describing the circular path through the separation chamber 16 and in proximity to the orifice 25 which is forced upon the fluid flow by the wall 9. This allows those particles which are suspended in the low velocity fluid flow along wall 33 of the connecting duct 19 to proceed uninterrupted into the output duct 8 without attempting to cross the high velocity center of the fluid flow. In the preferred embodiment the wall 27 is a flat, planar surface which, if extended to intersect the wall 33, forms an angle with wall 33 of approximately 57 degrees and 20 minutes.

The collection chamber 18 is in communication with and connects to the second separation chamber 16 through the orifice 25 in the wall 27. The collection chamber 18 is comprised of wall 10, wall 12 and a means for removal of particulate matter 28 which settles to the bottom of the collection chamber 18. The means for removal of particulate matter 28 which settles to the bottom of the collection chamber 18 is located at the bottom of the collection chamber 18 and may comprise a drawer which may be intermittently removed and emptied of particulate matter or it may comprise various more complex valve and/or conveyor mechanisms which accomplish the same task of removing the settled particulate matter from the collection chamber 18 without allowing significant fluid flow out of the collection chamber 18. The collection chamber 18 may include as additional elements a means for settling particulate matter 29 which is suspended in the fluid within the collection chamber 18, a baffle 30 which extends into the collection chamber 18 a sufficient distance to inhibit interaction between eddy currents and random fluid currents within the collection chamber 18 and the circular fluid flow path within the second separation chamber 16, and an output orifice 31 in the wall 12 of the collection chamber 18 which may be of adjustable size. The means for settling particulate matter 29 which is suspended in the fluid within the collection chamber 18 is located behind the baffle 30 and is shielded by the baffle 30 from the circulating fluid flow in the second separation chamber 16. The means for settling particulate matter 29 may comprise an ultra sound transducer, an electrostatic deflector, a spray nozzle as indicated in the drawing of the preferred embodiment, or any other device which is capable of forcing fine particulate matter suspended in the essentially static fluid within the collection chamber 18 down to the means for removal of particulate matter 28. The output orifice 31 should be small in relation to the orifice 25 as the fluid flow through the collection chamber 18 should be minimal. The purpose of the output orifice 31 is to allow adjustment of the fluid back pressure generated within the collection chamber 18 thereby adjusting the location of the barrier to the fluid flow within the second separation chamber 16 which is created by the backpressure to the fluid flow from the collection chamber 18. The location of the output orifice 31 within the collection chamber 18 must be such as will create minimal circulating fluid currents within the collection chamber 18 and have negligible effect on the circulating fluid flow within the second separation chamber 16. The location of the output orifice 31 in the preferred embodiment is shielded from the input orifice 25 by the baffle 30 and is in a section of the collection chamber 18 wall 12 which allows the collection chamber 18 to communicate with the output duct 8.

The fluid flow leaving the second separation chamber 16 will enter the output duct 8 through the output orifice 26. The output duct 8 in the preferred embodiment is comprised of the wall 33 of the connection duct 19, the wall 12 of the collection chamber 18, the wall 14 of the collection chamber 17 and an output orifice 32. The output duct allows communication from the second separation chamber 16 through the output orifice 26 with the output orifice 32 of the invention.

I claim:

1. Apparatus for separating particulate matter from a flowing fluid, which comprises:
   two side walls which each connect to every wall hereinafter mentioned to define chambers,
   a first separation chamber having a curved outer wall and an inner wall which provides an inlet orifice and two outlet orifices,
   a first collection chamber which communicates with the first separation chamber through one of the outlet orifices in said first separation chamber to receive particulate matter which has been separated from the fluid flow in said first separation chamber and which comprises a vessel having one inlet orifice and one outlet orifice of variable dimension to control the back-pressure encountered at the inlet orifice,
   a second separation chamber having a curved outer wall and an inner wall which provides an inlet orifice and two outlet orifices,
   said second separation chamber communicating with the first separation chamber through the inlet orifice of the second separation chamber and the outlet orifice of the first separation chamber which does not provide communication with a collection chamber, a second collection chamber which communicates with the second separation chamber through one of the outlet orifices in said second separation chamber to receive particulate matter which has been separated from the fluid flow in said second separation chamber and which comprises a vessel having one inlet orifice and one outlet orifice of variable dimension to control the back-pressure at the inlet orifice.

2. The apparatus of claim 1 wherein the curved outer wall of each of said separation chambers is such as will cause the flowing fluid entering the separation chamber at its inlet orifice to take a circular path toward the outlet orifice through which the separation chamber communicates with a collection chamber.

3. The apparatus of claim 1 wherein the inner wall of each of said separation chambers is constructed and positioned such that it causes no turbulence in the fluid flow as said flow describes a path into the separation chamber through said chamber's input orifice, past the outlet orifice of said chamber through which communication with a collection chamber occurs, and out of the separation chamber's second outlet orifice.

4. The apparatus of claim 1 wherein the inner wall of each of said separation chambers is positioned such that approximately one-half of the flowing fluid entering the separation chamber through the inlet orifice flows out of the separation chamber through the outlet orifice which does not provide communication between the separation chamber and a collection chamber without being forced into a circular path by the curved outer wall of the separation chamber.

5. The apparatus of claim 1 wherein said inlet orifice of the first separation chamber and the outlet orifice of the first separation chamber which does not provide communication between said first separation chamber and a collection chamber are adjacent to one another and wherein said inlet orifice of the second separation chamber and the outlet orifice of the second separation chamber which does not provide communication between said second separation chamber and a collection chamber are adjacent to one another.

6. The apparatus of claim 1 wherein the size, shape and location of the input orifice of each separation chamber are such as will direct the incoming flow of fluid onto the curved outer wall of the separation chamber.

7. The apparatus of claim 1 wherein an input duct is attached to the input orifice of the first separation chamber, said input duct providing walls which converge toward said input orifice.

8. The apparatus of claim 7 wherein the angle formed between the bottom wall of the input duct and the inner wall of the first separation chamber is approximately 57 degrees and 20 minutes.

9. The apparatus of claim 1 wherein each of the collection chambers provides a baffle which inhibits the production of turbulence or currents in the fluid within the collection chambers.

10. The apparatus of claim 1 wherein each of the collection chambers provides a means to settle the particulate matter which is suspended in the fluid within the collection chamber to the bottom of the collection chamber.

11. The apparatus of claim 1 wherein a duct connects an outlet orifice of the first separation chamber, said outlet orifice not being the outlet orifice which allows communication between the first separation chamber and the first collection chamber, to the inlet orifice of the second separation chamber.

12. The apparatus of claim 1 wherein each of the collection chambers provides a means for removing particulate matter which has settled to the bottom of the collection chamber without allowing significant fluid flow through the collection chamber.

13. The apparatus of claim 11 wherein the angle formed between the bottom wall of the connecting duct and the inner wall of the second separation chamber is approximately 57 degrees and 20 minutes.

14. Apparatus for separating particulate matter from a flowing fluid, which comprises:

two side walls which each connect to every wall hereinafter mentioned to define chambers, a first separation chamber having a curved outer wall and an inner wall which provides an inlet orifice and two outlet orifices, a first collection chamber which communicates with the first separation chamber through one of the outlet orifices in said first separation chamber to receive particulate matter which has been separated from the fluid flow in said first separation chamber and which comprises a vessel having one inlet orifice and one outlet orifice of variable dimension to control the back-pressure encountered at the inlet orifice, a second separation chamber having a curved outer wall and an inner wall which provides an inlet orifice and two outlet orifices, said second separation chamber communication with the first separation chamber through the inlet orifice of the second separation chamber and the outlet orifice of the first separation chamber which does not provide communication with a collection chamber, a second collection chamber which communicates with the second separation chamber through one of the outlet orifices in said second separation chamber to receive particulate matter which has been separated from the fluid flow in said second separation chamber and which comprises a vessel having one inlet orifice of variable dimension to control the back pressure at the inlet orifice, said curved outer wall of each of said separation chambers being constructed and positioned such that the flowing fluid entering the separation chamber through its inlet orifice is caused to take a circular path toward the outlet orifice of the separation chamber which allows communication with a collection chamber, said inner wall of each of said separation chambers being constructed and positioned such that it causes no turbulence in the fluid flow as said flow describes a path into the separation chamber through said chamber's input orifice, past the outlet orifice of said chamber through which communication with a collection chamber occurs, and out of the separation chamber's second outlet orifice, said inner wall of each of said separation chambers being constructed and positioned such that approximately one-half of the flowing fluid entering the separation chamber through its inlet orifice flows out of the separation chamber without being forced into a circular path by the curved outer wall of the separation chamber, said inlet orifice of the first separation chamber and the outlet orifice of the first separation chamber which does not provide communication between said separation chamber and a collection chamber being adjacent to one another, said inlet orifice of the second separation chamber and the outlet orifice of the second separation chamber which does not provide communication between said separation chamber and a collection chamber being adjacent to one another, a duct which connects the outlet orifice of the first separation chamber, said outlet orifice not being the orifice which allows communication between the first separation chamber and the first collection chamber, to the inlet orifice of the second separation chamber.

15. The apparatus of claim 14 wherein the angle formed between the bottom wall of the input duct and the inner wall of the first separation chamber is approximately 57 degrees and 20 minutes.

16. The apparatus of claim 14 wherein each of the collection chambers provides a baffle which inhibits the production of turbulence or currents in the fluid within the collection chambers.

17. The apparatus of claim 14 wherein each of the collection chambers provides a means for removing particulate matter which has settled to the bottom of the collection chamber without allowing significant fluid flow through the collection chamber.

18. The apparatus of claim 14 wherein each of the collection chambers provides a means to settle the particulate matter which is suspended in the fluid within the collection chamber to the bottom of the collection chamber.

* * * * *